United States Patent
Oakes, III et al.

(10) Patent No.: US 9,450,935 B1
(45) Date of Patent: *Sep. 20, 2016

(54) SYSTEMS AND METHODS FOR DEPLOYMENT OF SECURE SHELL DEVICES

(71) Applicant: United Services Automobile Association (USAA), San Antonio, TX (US)

(72) Inventors: Charles L. Oakes, III, San Antonio, TX (US); Reynaldo Medina, III, San Antonio, TX (US); Bradly J. Billman, San Antonio, TX (US)

(73) Assignee: UNITED SERVICES AUTOMOBILES ASSOCIATION (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,844

(22) Filed: Jun. 23, 2014

Related U.S. Application Data (63) Continuation of application No. 13/770,223, filed on Feb. 19, 2013, now Pat. No. 8,789,148, which is a continuation of application No. 13/331,781, filed on Dec. 20, 2011, now Pat. No. 8,381,280, which is a continuation of application No. 12/100,330, filed on Apr. 9, 2008, now Pat. No. 8,082,577.

(51) Int. Cl.
| | |
|---|---|
| *G06F 21/00* | (2013.01) |
| *H04L 29/06* | (2006.01) |
| *G06F 7/04* | (2006.01) |
| *G06F 15/16* | (2006.01) |
| *G06F 17/30* | (2006.01) |

(52) U.S. Cl.
CPC ........... *H04L 63/08* (2013.01); *H04L 63/0861* (2013.01)

(58) Field of Classification Search
None
See application file for complete search history.

(56) References Cited

U.S. PATENT DOCUMENTS

| | | | | |
|---|---|---|---|---|
| 5,455,953 | A  * | 10/1995 | Russell | 710/266 |
| 7,461,081 | B2 * | 12/2008 | Matsuda et al. | |
| 7,590,710 | B1 * | 9/2009 | Kokal et al. | 709/219 |
| 2005/0086328 | A1 * | 4/2005 | Landram et al. | 709/220 |
| 2007/0168521 | A1 * | 7/2007 | Kaji et al. | 709/227 |
| 2008/0195706 | A1 * | 8/2008 | Li et al. | 709/205 |

* cited by examiner

*Primary Examiner* — Shin-Hon Chen
(74) *Attorney, Agent, or Firm* — Baker & Hostetler LLP (57) ABSTRACT

A shell device with minimal software and/or hardware resources can download from a server configuration information and/or user data in order to allow the shell device to communicate with other computing devices (whether cell phones, personal digital assistants, laptops, and the like). Various security features can also be used herein, including a shell device password and a server network access password. In another aspect, any time code and/or data is downloaded from the server to the shell device, such code and/or data resides on the shell device during the time of a communication between the server and the shell device; thereafter, it can be deleted, thereby returning the shell device to its minimalistic resource state. When the shell device contacts the server again and attempts to establish another communication, such code and/or data can be downloaded anew, and after the communication it can be deleted again.

20 Claims, 10 Drawing Sheets

SYSTEMS AND METHODS FOR DEPLOYMENT OF SECURE SHELL DEVICES

CROSS-REFERENCE TO RELATED SUBJECT MATTER

This application is a continuation of U.S. patent application Ser. No. 13/770,223, which is a continuation of U.S. patent application Ser. No. 13/331,781, filed Dec. 20, 2011, now U.S. Pat. No. 8,381,280, which is a continuation application of U.S. patent application Ser. No. 12/100,330, filed on Apr. 9, 2008, now U.S. Pat. No. 8,082,577. This application is also related in subject matter to, and incorporates herein by reference in its entirety, each of the following: U.S. patent application Ser. No. 12/100,326, filed on Apr. 9, 2008; and U.S. patent application Ser. No. 12/100,333, filed on Apr. 9, 2008, now U.S. Pat. No. 8,041,788.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright® 2008, USAA.

FIELD OF THE INVENTION

The present subject matter relates to the field of computing devices, and more particularly, to methods and systems for deployment of shell devices, although such methods and systems correspond to merely an exemplary and non-limiting field of the presently disclosed subject matter.

BACKGROUND OF THE INVENTION

Computing devices, such as mobile devices, are prevalent in today's society. Mobile phones, personal digital assistants (PDAs), laptops, and the like, are being used increasingly to connect users to each other and to various services in a variety of contexts and situations. However, such mobile devices often times lack the requisite security features such that they can be useful only to the intended users. Moreover, such devices can be misused by unintended users who may leverage the hardware and software resident on such mobile devices in undesirable ways vis-à-vis the intended users and/or any service providers. Thus, to address at least these problems, and other such problems, various aspects of the presently disclosed subject matter are disclosed herein.

SUMMARY OF THE INVENTION

Systems and methods are provided for the deployment of secure shell devices. In one exemplary and non-limiting aspect of the present disclosure, a shell device with minimal software and/or hardware resources is disclosed, and a server can download to this shell device configuration information and/or user data in order to allow the shell device to communicate with other computing devices (whether cell phones, personal digital assistants, laptops, and the like). Various security features can also be used in association with this technology, including a shell device password and a server network access password. In one exemplary and non-limiting aspect of the present disclosure, any time code and/or data is downloaded from the server to the shell device, such code and/or data resides on the shell device during the time of a communication between the server and the shell device; thereafter, it can be deleted, thereby returning the shell device to its minimalistic resource state. When the shell device contacts the server again and attempts to establish a communication, such code and/or data can be downloaded anew, and after the communication it can be deleted again.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. The following figures are included.

DETAILED DESCRIPTION OF ILLUSTRATIVE EMBODIMENTS

Exemplary Aspects of Deployment of Secure Shell Devices

Figure 1:
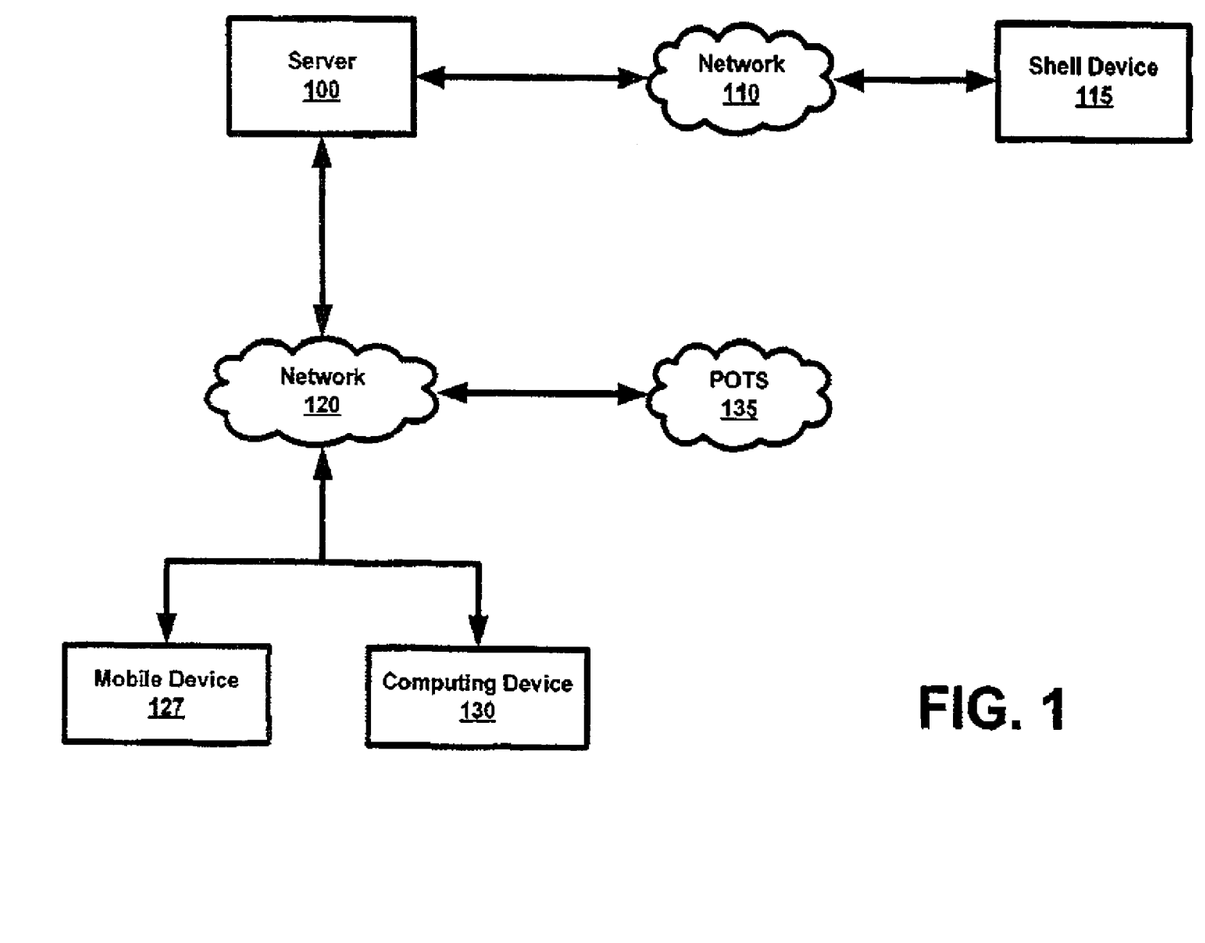
FIG. 1 illustrates a general architecture of how shell devices can be deployed in a secure manner.

FIG. 1 illustrates a general architecture of how shell devices can be deployed in a secure manner. A shell device can comprise of a mere "shell" computing device in that it can have only the minimum software and/or hardware components necessary for secure communication with a server. Specifically, in FIG. 1, a shell device 135 that is remote from a server 100 can communicate with the server 100 via some network 110. The notion of what is a device, a server, or a network is explained in more detail with reference to FIGS. 9 and 10, either alone or in combination.

The server 100 can act as a broker between the shell device 115 and other computing devices, including but not limited to other mobile devices 127 or other computing devices 130 (such as stationary personal computers). The server can broker communications via a wireless or wired network 120. In this respect the first mentioned network 110 can likewise be wireless or wired. Both networks 110 and 120 can also comprise a combination of wired and wireless networks. As is shown, in some cases standard plain old telephony systems (POTS) 135 can be used. Otherwise, where more convenient, Ethernet and/or wireless networks can be used.

The server 100 can be a proprietary server that is governed under the auspices of a private enterprise. Such an enterprise can broker communications between mobile devices, thereby inserting itself in typical mobile carrier networks. The extent of involvement of an enterprise governing the shown server 100 will depend on a variety of factors, some of which are discussed below. These factors are meant to be exemplary and non-limiting, thus other equivalent aspects are contemplated herein also. Thus, in one scenario, the server 100 can be a dedicated server to the shell device 115, and the server 100 can otherwise interact with a traditional service provider.

Figure 2:
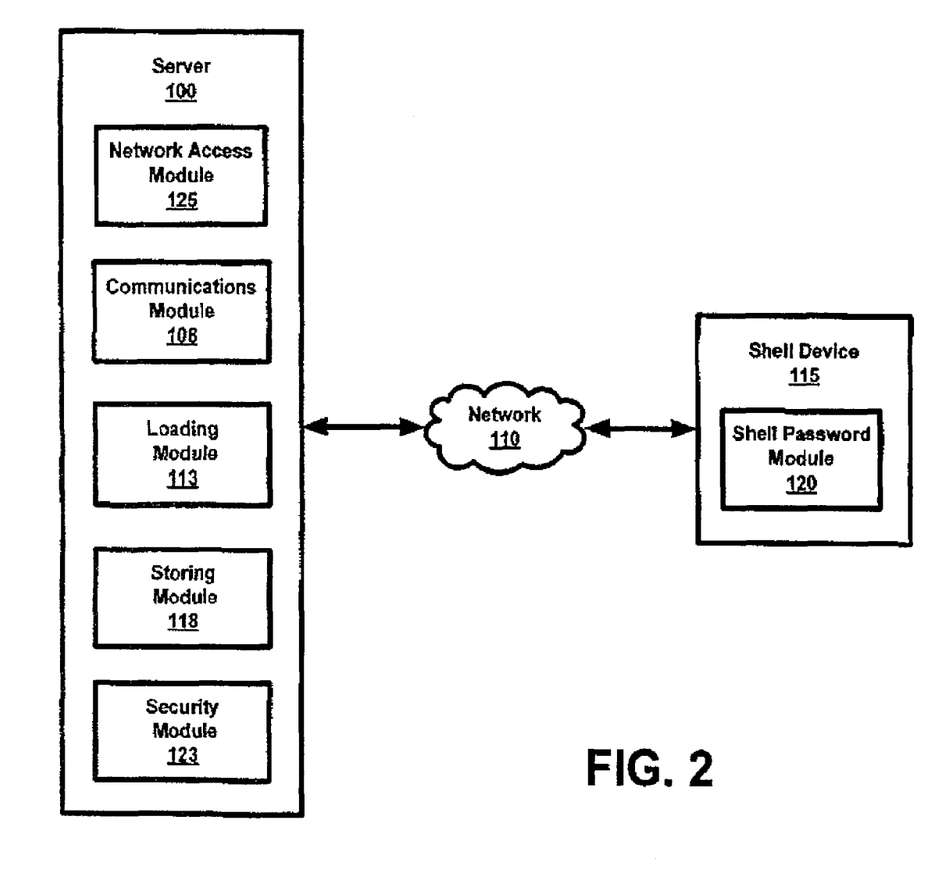
FIG. 2 illustrates, in contrast to FIG. 1, a more detailed architecture of a shell device deployment framework.

Turning now to FIG. 2, it illustrates a more detailed architecture of a shell device deployment framework. The server 100 of FIG. 1 can have various modules to perform a variety of tasks. It should be noted herein that the notion of a "module," although typically understood to correspond to software, is interpreted herein broadly to also include hardware devices. For example, the shown storing module 118 can include computer executable instructions for storing information (for instance, code and/or data), or additionally it can also correspond to the various hardware memory devices discussed in detail with respect to FIG. 9.

The server 100 in FIG. 2 has a network access module 125 that can control whether a shell device 115 (whether mobile or stationary and whether remote or local) will have access to a network, and hence whether the shell device 115 will be able to communicate with other computing devices, as shown in FIG. 1. The network access module 125 can make the accessibility determination based on a variety of factors, such as logins, passwords, biometric data, or some combination thereof.

The communications module 108 can have a variety of responsibilities, such as communication with the shell device 115 and brokering of communications between the shell device 115 and other computing devices. It can be responsible for downloading the necessary information (code and/or data) such that the shell device 115 can communicate in the first place. Further to this point, the loading module 113 can be responsible for the actual loading of any configuration information and user data from the server 100 to the shell device 115. Thus, these two modules 108, 113 can work in concert or can be actually part of the same module. This can be true of any of the modules discussed herein, thus the term "module" is used herein conceptually and in practice (as discussed below in the implementation section) it can be instantiated in a variety of ways, depending on the need.

The storing module 118 can be responsible for storing any configuration information and user data on the shell device 115. It should also be understood, that this module 118 and any of the other modules can also reside on the shell device 115, depending on the implementation. Herein, all modules 125, 108, 113, 118, 123 are shown as residing on the server 100, but any of them could also reside on the shell device 115, whether actually or virtually.

Lastly, the security module 123 can be responsible for making sure that any information that is downloaded from the server 100 to the shell device 115 is resident on the shell device 115 for a desired amount of time. By way of example and not limitation, configuration information and/or user data can be downloaded for only the period of time of a communication between the server 100 and the shell device 115. Alternatively, such information and/or data can be downloaded shortly after or shortly before such a communication, or still in other cases, it can be downloaded for a predetermined and designated period of time. In any case, whatever bytes are transferred from the server 100 to the shell device 115, such bytes can be monitored by the security module 123 and then permanently deleted from the shell device 115, thereby preserving the nature of the shell device 115 as a computing device having minimal software and/or (functional) hardware components.

Figure 3:
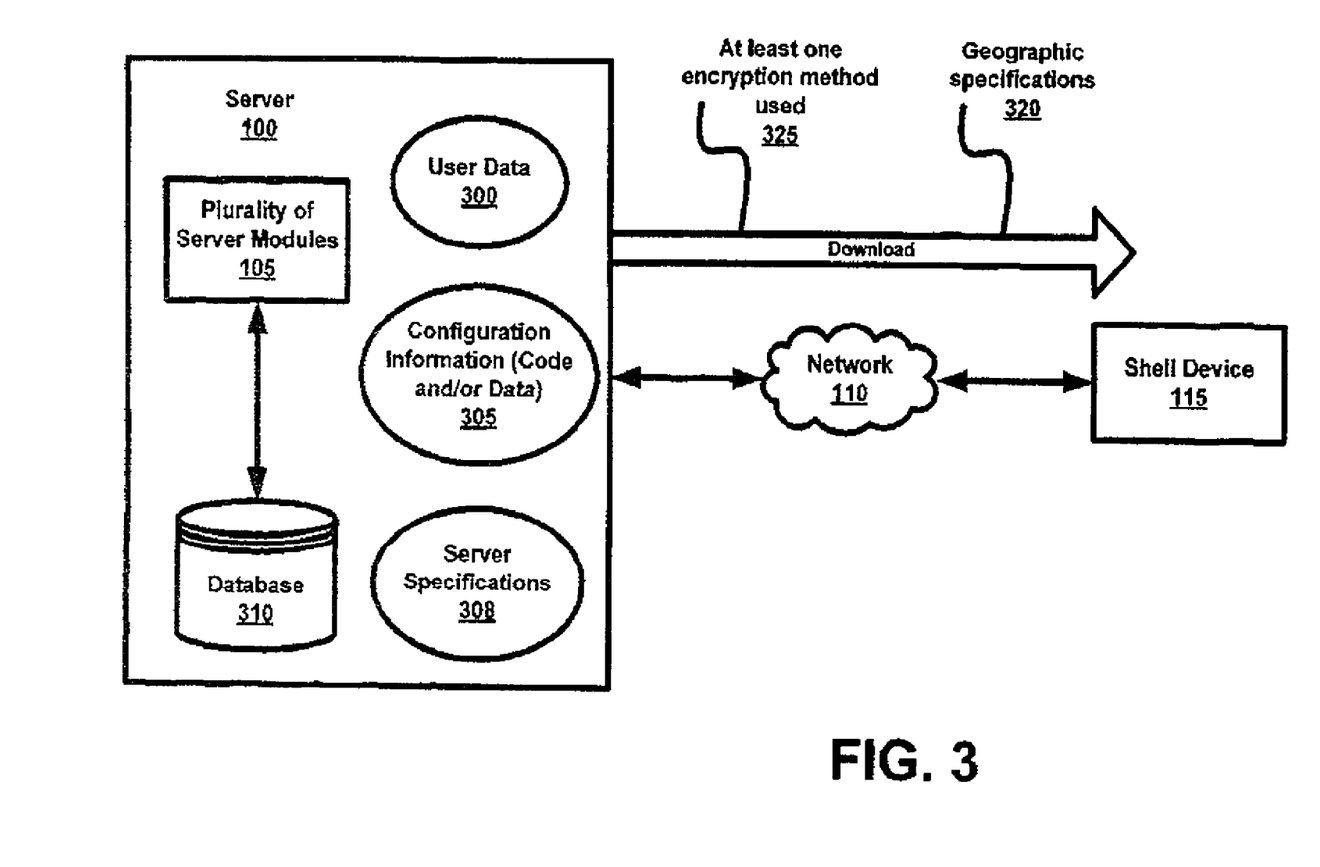
FIG. 3 illustrates the types of bytes that can be downloaded from a server to the shell device.

FIG. 3 illustrates the types of bytes that can be downloaded from the server 100 to the shell device 115. A plurality of modules 105 (such as the modules discussed with reference to FIGS. 1 and 2) can reside on the server 100. These modules 105 can operate on and process such information as user data 300, configuration information 305 and certain server specifications 308. The user data 300 can be data tailed to or about a user of a shell device 115, such as name, date of birth, social security number, a set of privileges associated with the user, list of available phone numbers to call, and so on. The configuration information 305 can include any code and/or data that can enable the shell device to start communicating with the server 100—and ultimately other computing devices. Finally, the server specifications 308 can list instances when and where any downloaded information to the shell device 115 should be deleted or otherwise limited. These specifications can be based on geographical information, security input information, and so on. Moreover, any of these resources 300, 305, 308 can be accessed by the plurality of shown modules 105, and these modules 105 can have access to a database 310 storing still other resources that can be useful in deploying the shell devices.

Once the shell device 115 contacts the server 100 (or vice-versa) via some network 110, the desired information can be downloaded from the server 100 to the shell device 115, and such information can be encrypted using at least one encryption mechanism. Moreover, such downloading can be subject to various specifications 308 discussed above, such as geographic specifications 320. Other specifications are also contemplated herein, including user biometric data. Such specifications can be related to each other or then can be logically and conceptually orthogonal, such as in the case of biometric specifications and signal strength specifications.

Once the requisite information is downloaded, it can reside on secure memory of the shell device 115 and reside thereon during the communications. In order to ensure that the device 115 will not be usable after such communications, the downloaded information can be completely deleted or otherwise encrypted. The shell device can then be contacted again, and the requisite information can be downloaded anew. Thus, in one implementation, desired information can be downloaded from the server 100 to the shell device 115 every time there are some communications between them (however, not every communication will require a download).

Figure 4:
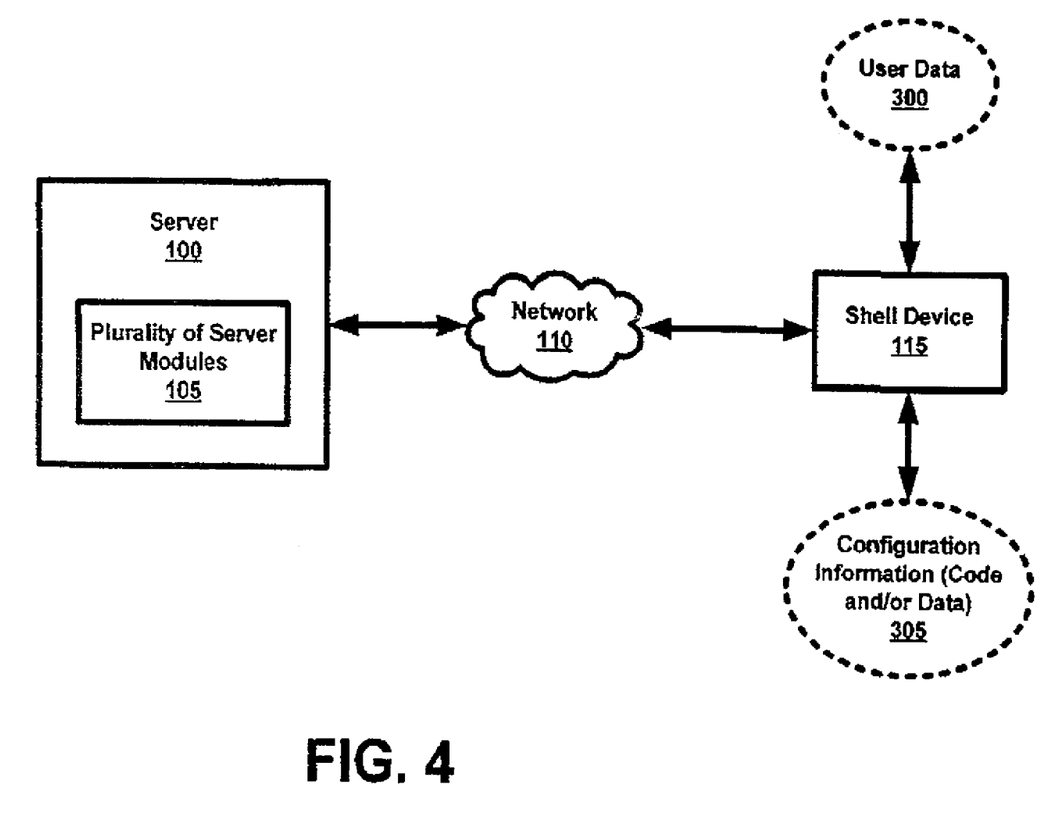
FIG. 4 illustrates user data and configuration information that has been downloaded from the server to the shell device.

FIG. 4 illustrates user data and configuration information that has been downloaded from the server 100 to the shell device 115. In this scenario, the configuration information 305 can provide protocols, schemas, and other data structures allowing the shell device 305 (that otherwise would not know this) how to communicate with the server 100. The user data 300, such as a list of available numbers to call can be downloaded in conjunction with the configuration information or not. In the case where the user data is not downloaded, a generic call option can be provided so that a user of the shell device 115 can contact an institution or enterprise that manages the server 100. Other information can also be downloaded, however, in order for the shell device 115 to be efficient and secure a limited amount of information will be downloaded.

Figure 5:
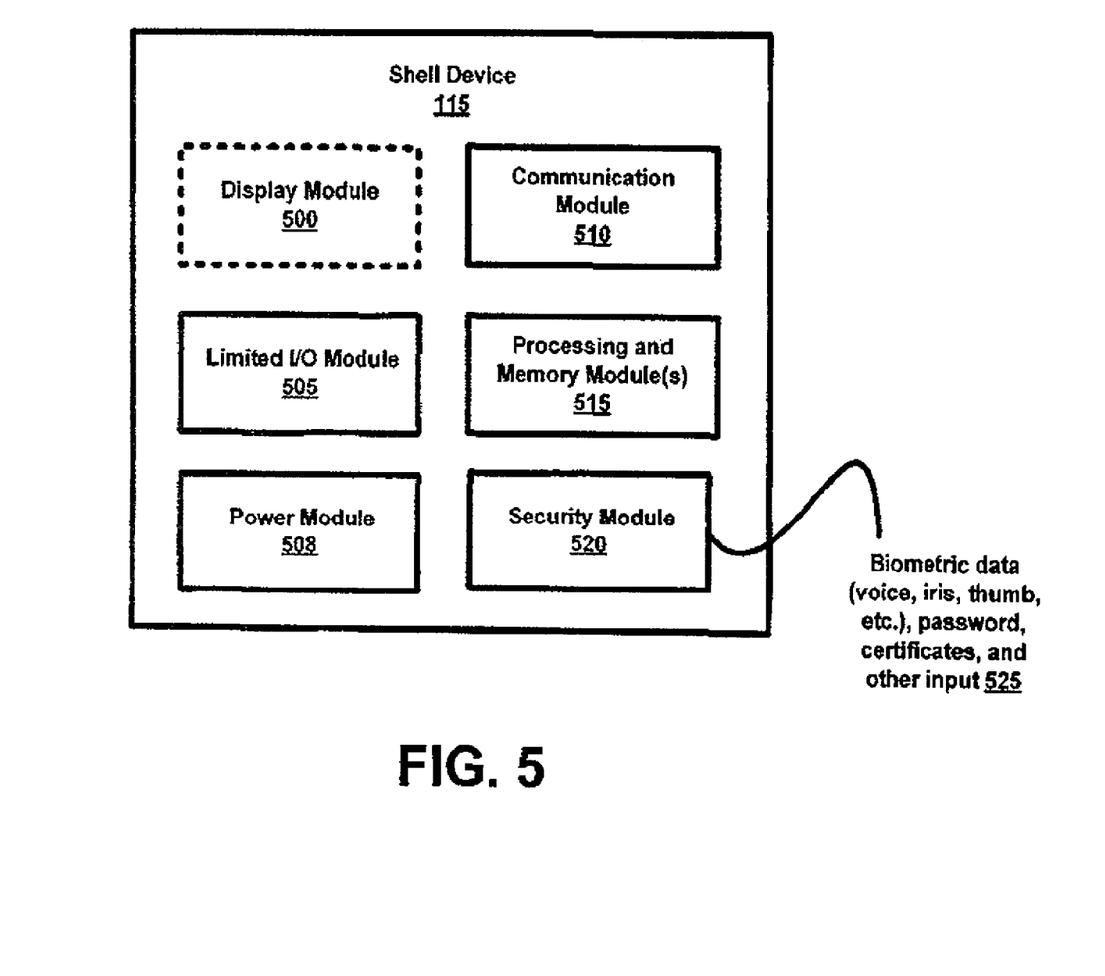
FIG. 5 illustrates various aspects of the shell device.

Various aspects of the shell device 115 are shown in FIG. 5. The shell device 115 can have a display module 500 (although it should be noted that this can be an optional feature, as is shown in the dotted outline of the module 500). In some instances, the shell device 115 can have such a minimalistic implementation that it can omit any display modules 500, thus using only such modules (in hardware parlance, devices) such as speakers and microphones. In any case, the shell device 115 can communicate with the server 100 via some input/output (I/O) module. Moreover, the I/O module 505 can interact with the communications module 510 (and these two modules 505, 510 can be one and the same module). The communications module 510 can be aware of the different communication protocols, while the I/O module 505 can be responsible for receiving and/or sending any incoming and/or outgoing information.

The processing and memory modules 515 can be used to manipulate the downloaded information discussed above, and then store and/or delete any such information. Furthermore, the security module 520 can monitor any of the downloaded information, via various mechanisms, such as biometric data, certificates, and/or other inputs 525. Lastly, the power module can be used to turn on or off the shell device 115, whether the power module 508 is a virtual button (such as on a touch screen) or a physical button. The power module 508, as was mentioned above in another context, thus encompasses both software and/or hardware components.

Figure 6:
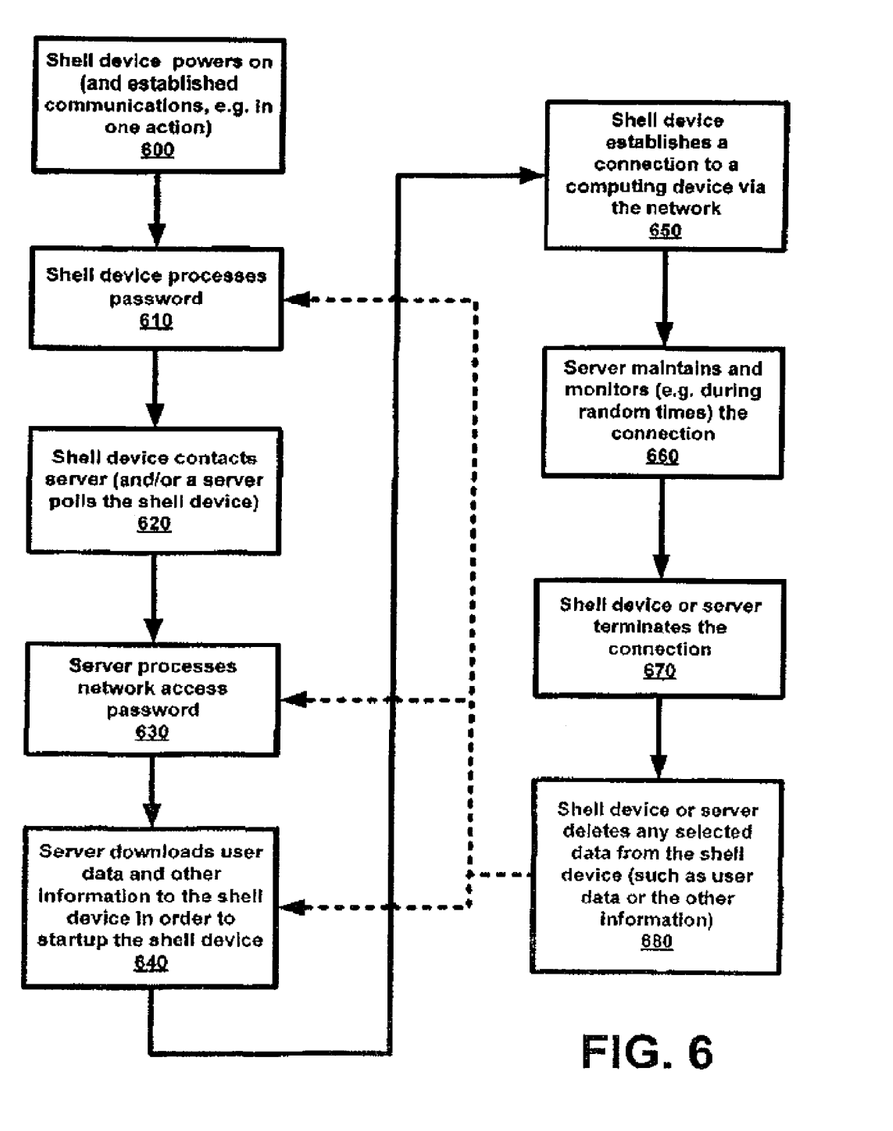
FIG. 6 illustrates an exemplary and non-limiting block diagram of various aspects of the shell device and server framework.

Next, FIG. 6 illustrates an exemplary and non-limiting block diagram of various aspects of the shell device and server framework. At block 600, the shell device can be turned on. With the turning on, in one step, communications with the server can be established. This can be accomplished with the push one on button—however, in other implementations other buttons can be used for each step in the present process.

At block 610, in order to provide shell device security, the shell device itself can ask for a password or some other biometric input in order to activate the device. If this input in valid, at block 620, the shell device can start to contact the server. In alternative aspects of the presently disclosed subject matter, the server can poll the shell device and the server can initiate the contact between the two computing devices. In any event, as an additional security measure, at block 630, the server can also ask for a network access password (and/or biometric input). This security measure can ensure that only intended users will have contact with other computing devices.

Next, at block 640 the server can start to download user data and other information, such as configuration code and/or data to the shell device in order to proved the shell device the means to contact other device (or to merely start communications with the server itself). At block 650, the shell device can establish a connection with such other devices via a protocol. This protocol can allow for a typical mobile phone connection or it can include some other connection, such as TCP/IP. During this connection, at block 660, the server can maintain and monitor the connection. Such monitoring can be performed at various times, whether these times are scheduled or random times.

At block 670, the connection can be ended after some period oftime, whether determined by a user of the shell device or by the server. Once the connection is ended, at block 680, the shell device or the server, depending on the implementation, can delete any information that was downloaded to the shell device, thereby returning the shell device to a computing device having minimal software resources and/or workable hardware resources. If the shell device user wants to initiate another connection, the process can start again at block 610 (or, alternatively, at block 630; or, alternatively, at block 640, depending on the implementation), as is indicated by the dashed lines.

Figure 7:
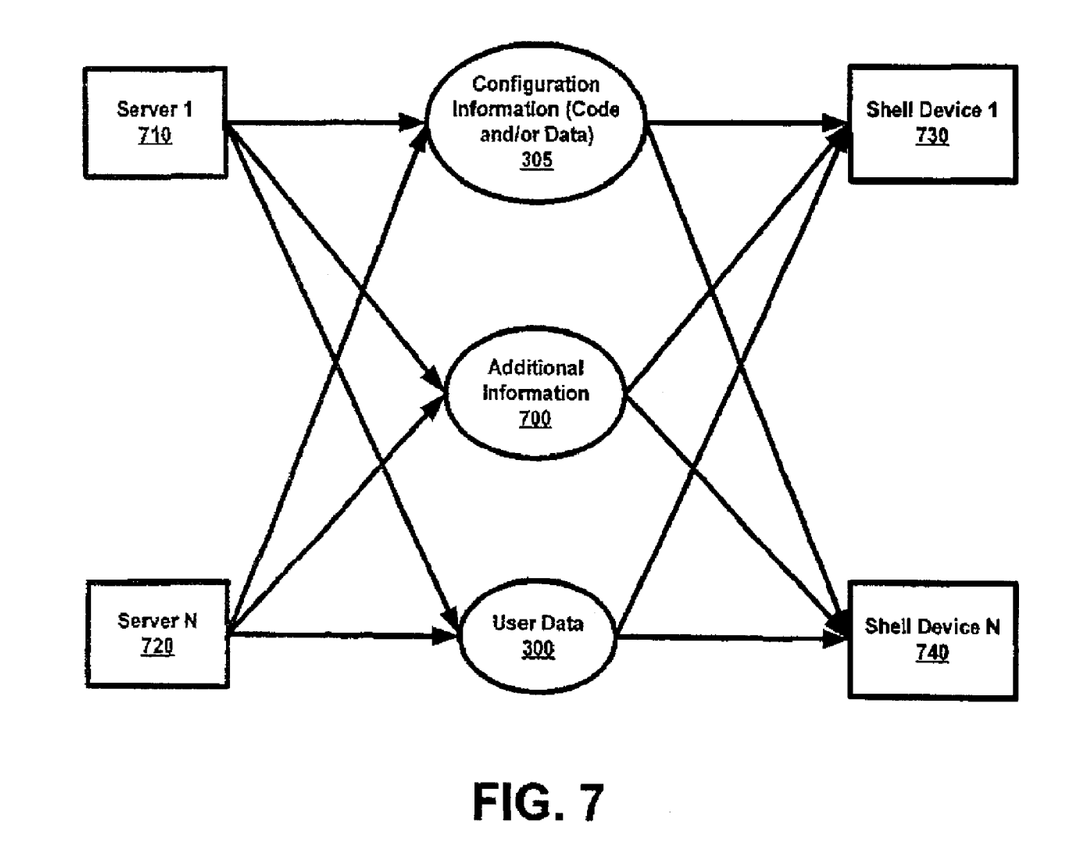
FIG. 7 illustrates various types of information maintained by the server and downloaded from the server that can reside on various devices in various combinations.

FIG. 7 illustrates yet another aspect of the presently disclosed subject matter, where the various types of information maintained by the server and downloaded from the server can reside on various devices in various combinations. Thus, the configuration information 305 can be provided wholly or in part from a first server 710 and/or a second server 720 to a first shell device 730 and/or a second shell device 740. Similar logic can hold true for the user data 300 or any additional information 700, such as email messages, short message service messages, voicemails, and just about any other code and/or data that can be distinct from user data and configuration information.

Figure 8:
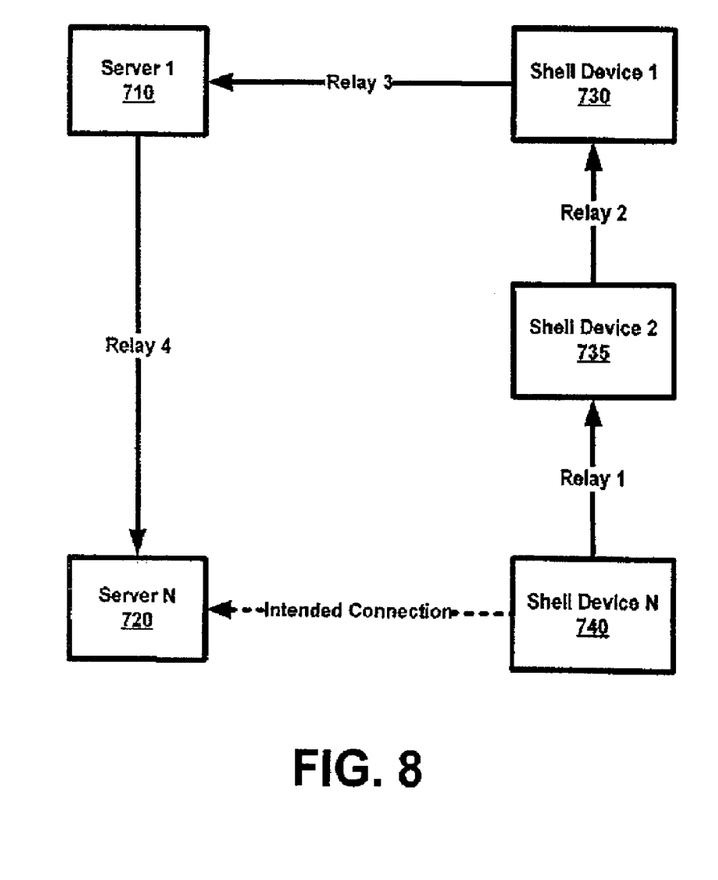
FIG. 8 illustrates the notion that shell devices could act as relays to other shell devices, thereby extending the connectability of a plurality of shell devices.

FIG. 8 illustrates still another aspect of the presently disclosed subject matter, where shell devices could act as relays to other shell devices, thereby extending the connectability of a plurality of shell devices. Thus, in FIG. 8 if server N 720 wanted to connect to server N 720, it could do directly (as illustrated by the dashed line), or in the alternative, it could do so indirectly via various relays. Thus, in this latter scenario, instead of connecting to server N 720 directly, shell device N 740 could first connect to another shell device 735, and this device 735 could connect to still another shell device 730, and this device 730 in turn could connect to a server 710, and this server 710 could connect to the intended connection server 720 N.

In some aspects, in order for this relay network to work, the shell devices 735, 730 and server 710 would have to be active, which would be workable if the number of shell devices in any given geographical area was substantial (at any given time any number of devices will be "on"). In other aspects, such shell devices 735, 730, and server 710 could passively relay any contact signals from shell device N 740 to server N 720. In still other aspects, a combination of active and passive connectivity regimes could be used.

The various aspects disclosed herein could be implemented as systems, practiced as methods, or embodied in computer readable media as computer executable instructions. Thus, the following discussion of the various implemented systems could equally apply to such methods and computer readable media. By way of example and not limitation, one system could be implemented for brokering secure mobile device communications via a server. A first server module could be used, where this module could be configured to establish communications with a remote shell computing device. Then, a second server module could be configured to load to the shell computing device configuration information for the shell computing device and user data associated with a user of the shell computing device. Finally, a third server module could be implemented and configured to store the configuration information and the user data at about a time of a start of a communication between the shell computing device and the server. Still in enhanced aspects, a fourth server module could be configured to permanently delete the configuration information and the user data from the computing device at about a time when the communication is set to end.

Depending on the need, the second server module could be configured to download to the shell computing device configuration information upon a request from the shell computing device or upon a determination made by the server. The server, in turn, could be configured to accept a network password before providing network access to the shell computing device and it could be configured to maintain, monitor, and encrypt the communication and further allow the shell computing device to communicate with another computing device remote from the server, such as another shell device, a mobile phone, a PDA, a laptop and the like.

During the aforementioned monitoring, if the server determines that the shell computing device has been used in a manner inconsistent with a specification on the server, the server can issue a memory wipe command. The specification can include geographical limitations, biometric standards, passwords, certificates, and the like. Per FIG. 7, in this system, at least one of the first server module, the second server module, the third server module, and the fourth server module can reside on server, and at least one of the first server module, the second server module, the third server module, and the fourth server module can reside on a computing device different from the server.

Another exemplary and non-limiting system can be employed for allowing secure communications with minimal software and hardware resources. This system can have a first client module configured to turn on a shell computing device; a second client module upon the shell computing device being turned on, can be configured to establish communications with a dedicated and remote server (the server 100 discussed above can be dedicated to the shell device or not dedicated, depending on the need); a third client module configured to receive configuration information and user data from the dedicated and remote server; and, a fourth client module can be configured to maintain the configuration information and user data during approximately the time of a communication between the shell computing device and the dedicated and remote server. Furthermore, the fourth client module can be configured to completely delete any information from the shell computing device about after the communication, including the configuration information and the user data.

The system can also further comprise a security module configured to solicit a shell module password for the shell computing device. And, the security module can be configured to check a network access password when the shell computing device is engaged in the communication with the server.

The aforementioned first client module can turn on the shell computing device and the second client module can establish communications with the dedicated and remote server in response to one action (such as pushing a button) on the shell computing device. The shell computing device can authenticate a user of the shell computing device via biometric data or some other authentication mechanism. In the former case, the biometric data can include at least one of (a) voice recognition, (b) iris scan, and (c) a thumb print.

As was mentioned above, the shell computing device can download and store the configuration information and the user data based on a geographical location of the shell computing device.

Lastly, still another exemplary and non-limiting system can be implemented for allowing secure communications between shell computing devices and dedicated servers to the shell computing devices. In this system, a first security module can be configured to receive a shell computing device password, and further configured to make a determination whether the shell computing device password is valid; a second security module can be configured to receive a network access password, and further configured to make a determination whether the network access password is valid; upon a validity determination that the shell computing device password is valid and the network access password is valid, another module can be configured provide to a shell computing device configuration information so that the shell computing device has enough information to contact a server, and a third security module can be configured to monitor the shell computing device and maintain information on the shell computing device about during a time of a communication between the shell computing device and the server, otherwise the third security module can be configured to permanently delete any of the information stored on the shell computing device.

In another aspect of this system, the determination whether the shell computing device password is valid is can be made before the determination whether the network access password is valid. Additionally, another module could continuously monitor the shell computing device via a least one specification, such as biometric data. The module that continuously monitors the shell computing device could perform the monitoring at scheduled or random times.

In still another aspect of this system, the module that provides configuration information to the shell computing device could also provide misinformation not related to the communication, thereby making it more difficult to identify sensitive information stored on the shell device. Any information that would be sensitive could be encrypted in a plurality of algorithms.

Exemplary Computing and Networking Environments for Deploying Mobile Devices

Figure 9:
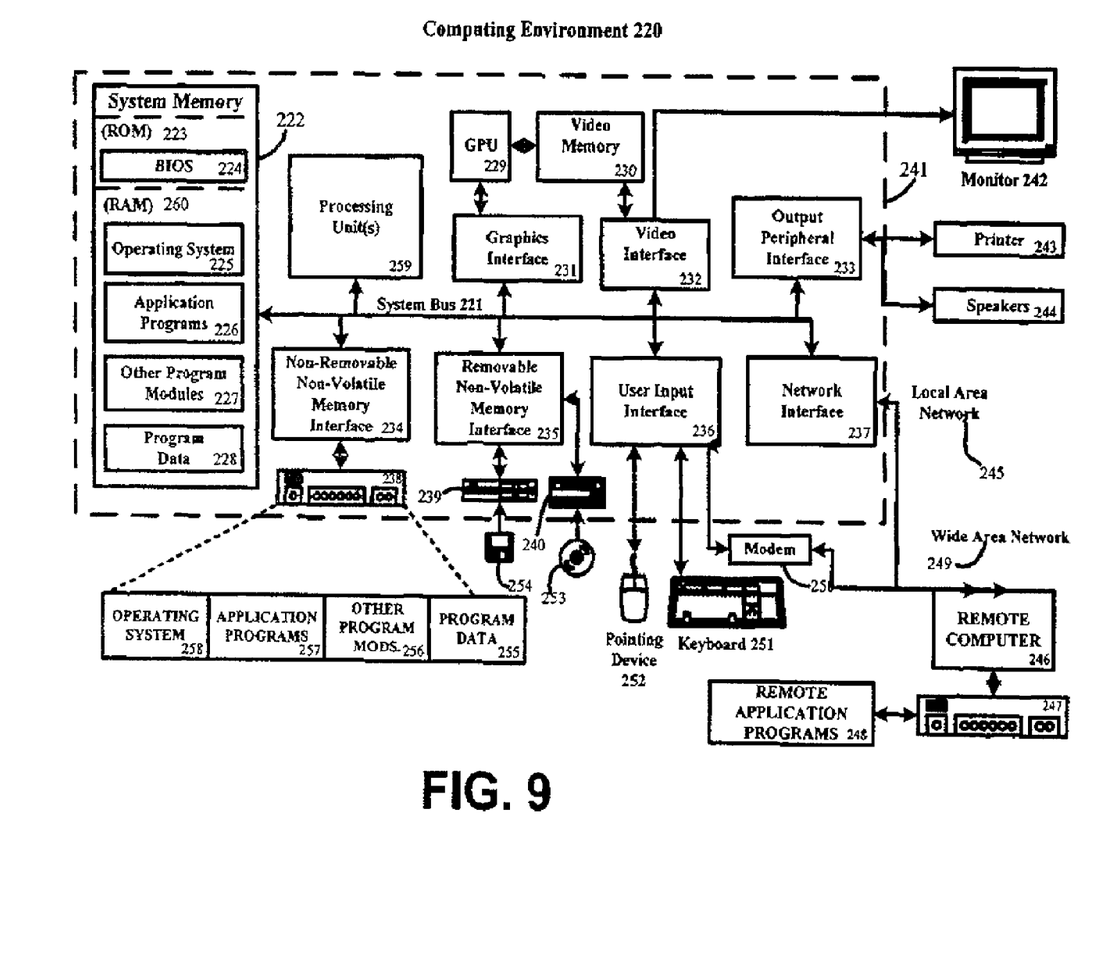
FIG. 9 illustrates a block diagram representing an exemplary computing device environment suitable for use in conjunction with the presently disclosed aspects.

Now Referring to FIG. 9, shown is a block diagram representing an exemplary computing device suitable for use in conjunction with implementing the systems and methods described above. For example, the computer executable instructions that carry out the processes and methods for deployment of secure mobile devices can reside and/or be executed in such a computing environment as shown in FIG. 9.

The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220.

Aspects of the presently disclosed subject matter can be operational with numerous other general purpose or special purpose computing system environments or configurations. Examples of well known computing systems, environments, and/or configurations that can be suitable for use with the presently disclosed subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. Thus, terms such as "computing devices" used herein can include any one of these computing systems—or some combination thereof.

Aspects of the presently disclosed subject matter can be implemented in the general context of computer-executable instructions, such as program modules, being executed by a computer. Generally, program modules can include routines, programs, objects, components, data structures, etc., that perform particular tasks or implement particular abstract data types. Aspects of the presently disclosed subject matter can also be practiced in distributed computing environments where tasks are performed by remote processing devices that are linked through a communications network. In a distributed computing environment, program modules can be located in both local and remote computer storage media including memory storage devices.

An exemplary system for implementing aspects of the presently disclosed subject matter can include a general purpose computing device in the form of a computer 241. Components of computer 241 can include, but are not limited to, a processing unit 259, a system memory 222, and a system bus 221 that couples various system components including the system memory to the processing unit 259. The system bus 221 can be any of several types of bus structures including a memory bus or memory controller, a peripheral bus, and a local bus using any of a variety of bus architectures.

Computer 241 typically includes a variety of computer readable media. Computer readable media can be any available media that can be accessed by computer 241 and includes both volatile and nonvolatile media, removable and non-removable media. By way of example, and not limitation, computer readable media can comprise computer storage media and communication media. Computer storage media can include both volatile and nonvolatile, removable and non-removable media implemented in any method or technology for storage of information such as computer readable instructions, data structures, program modules or other data. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media can embody computer readable instructions, data structures, program modules or other data in a modulated data signal such as a carrier wave or other transport mechanism and includes any information delivery media.

The term "modulated data signal" can correspond to a signal that has one or more of its characteristics set or changed in such a manner as to encode information in the signal. By way of example, and not limitation, communication media can include wired media such as a wired network or direct-wired connection, and wireless media such as acoustic, RF, infrared and other wireless media. Combinations of the any of the above should also be included within the scope of computer readable media. Moreover, as was suggested above, computer readable media can be embodied in tangible media.

The system memory 222 can include computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 can typically contain data and/or program modules that are immediately accessible to and/or presently being operated on by processing unit 259. By way of example, and not limitation, FIG. 9 illustrates operating system 225, application programs 226, other program modules 227, and program data 228.

The computer 241 can also include other removable/non-removable, volatile/nonvolatile computer storage media. By way of example only, FIG. 9 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 9, provide storage of computer readable instructions, data structures, program modules and other data for the computer 241. In FIG. 9, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user can enter commands and information into the computer 241 through input devices such as a keyboard 251 and pointing device 252, commonly referred to as a mouse, trackball or touch pad. Other input devices (not shown) can include a microphone, joystick, game pad, satellite dish, scanner, or the like. These and other input devices are often connected to the processing unit 259 through a user input interface 236 that is coupled to the system bus, but can be connected by other interface and bus structures, such as a parallel port, game port or a universal serial bus (USB). A monitor 242 or other type of display device is also connected to the system bus 221 via an interface, such as a video interface 232. In addition to the monitor, computers can also include other peripheral output devices such as speakers 244 and printer 243, which can be connected through a output peripheral interface 233.

The computer 241 can operate in a networked environment using logical connections to one or more remote computers, such as a remote computer 246. The remote computer 246 can be a personal computer, a server, a router, a network PC, a peer device or other common network node, and typically includes many or all of the elements described above relative to the computer 241, although only a memory storage device 247 has been illustrated in FIG. 9. The logical connections depicted in FIG. 9 include a local area network (LAN) 245 and a wide area network (WAN) 249, but can also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which can be internal or external, can be connected to the system bus 221 via the user input interface 236, or other appropriate mechanism. In a networked environment, program modules depicted relative to the computer 241, or portions thereof, can be stored in the remote memory storage device. By way of example, and not limitation, FIG. 9 illustrates remote application programs 248 as residing on memory device 247. It will be appreciated that the network connections shown are exemplary and other means of establishing a communications link between the computers can be used.

It should be understood that the various techniques described herein can be implemented in connection with hardware or software or, where appropriate, with a combination of both. Thus, the methods and apparatus of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that can implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language can be a compiled or interpreted language, and combined with hardware implementations.

Although exemplary embodiments can refer to utilizing aspects of the presently disclosed subject matter in the context of one or more stand-alone computer systems, the said subject matter is not so limited, but rather can be implemented in connection with any computing environment, such as a network or distributed computing environment. Still further, aspects of the presently disclosed subject matter can be implemented in or across a plurality of processing chips or devices, and storage can similarly be effected across a plurality of devices. Such devices might include personal computers, network servers, handheld devices, supercomputers, or computers integrated into other systems such as automobiles and airplanes.

In light of the diverse computing environments that can be built according to the general framework provided in FIG. 9, the systems and methods provided herein cannot be construed as limited in any way to a particular computing architecture. Instead, the presently disclosed subject matter should not be limited to any single embodiment, but rather should be construed in breadth and scope in accordance with the appended claims. Moreover, any of the above mentioned components can be 10, shown is an exemplary networked computing environment in which many computerized processes can be implemented to perform the processes described above. For example, parallel computing can be part of such a networked environment with various clients on the network of FIG. 10 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing, such as the one mentioned with respect to FIG. 7, provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices can have applications, objects or resources that can implicate the processes described herein.

Figure 10:
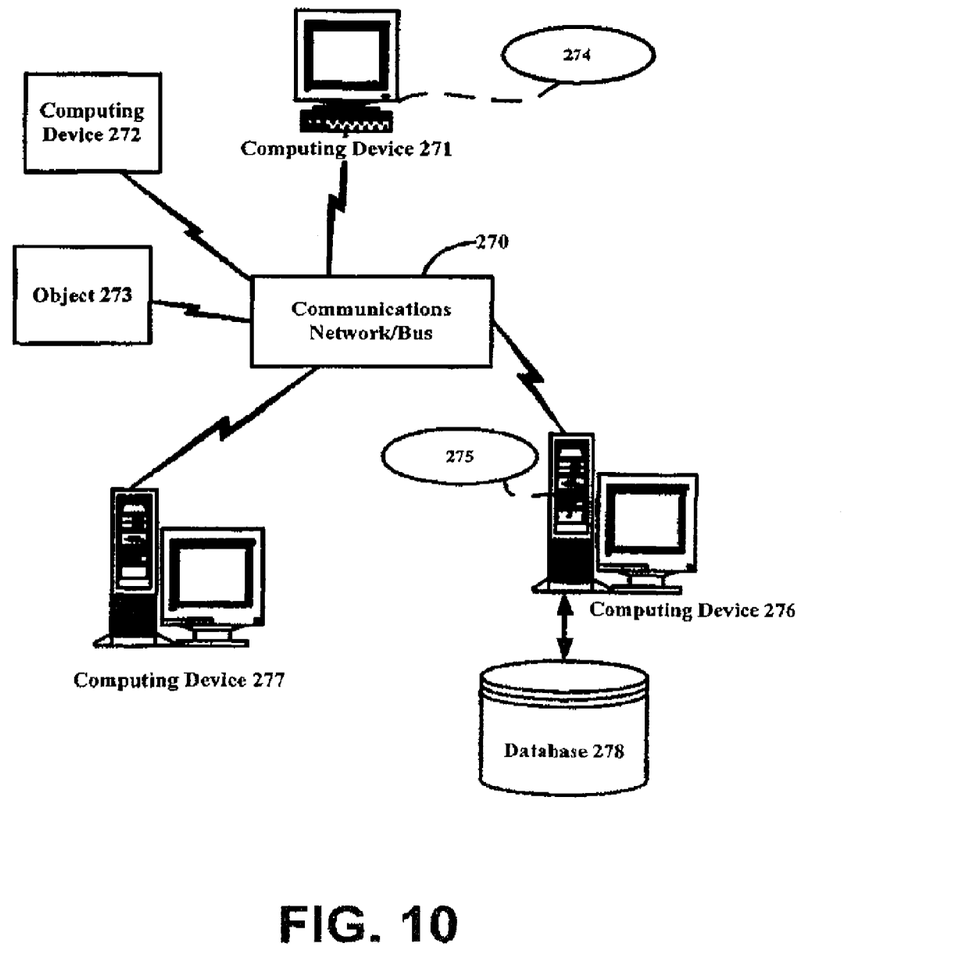
FIG. 10 illustrates an exemplary networked computing environment in which many computerized aspects may be implemented to perform the aforementioned functions.

FIG. 10 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 can comprise or make use of programs, methods, data stores, programmable logic, etc. The entities 271, 272, 273, 274, 275, 276, 277 and 278 can span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity, module, or device can be responsible for the maintenance and updating of a database 278 or other storage element.

This network 270 can itself comprise other computing entities that provide services to the system of FIG. 10, and can itself represent multiple interconnected networks. In accordance with an aspect of the presently disclosed subject matter, each entity 271, 272, 273, 274, 275, 276, 277 and 278 can contain discrete functional program modules that might make use of an API, or other object, software, firmware and/or hardware, to request services of one or more of the other entities 271, 272, 273, 274, 275, 276, 277 and 278.

It can also be appreciated that an object, such as 275, can be hosted on another computing device 276. Thus, although the physical environment depicted can show the connected devices as computers, such illustration is merely exemplary and the physical environment can alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, can be used in conjunction with the systems and methods provided.

A network infrastructure can enable a host of network topologies such as client/server, peer-to-peer, or hybrid architectures. The "client" can be a member of a class or group that uses the services of another class or group to which it is not related. In computing, a client can be a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 10, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process can be active in a first computer system, and the server process can be active in a second computer system, communicating with one another over a communications medium, thus providing distributed functionality and allowing multiple clients to take advantage of the information-gathering capabilities of the server. Any software objects can be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) can be coupled to one another via TCP/IP connection(s) for high-capacity communication.

In light of the diverse computing environments that can be built according to the general framework provided in FIG. 10 and the further diversification that can occur in computing in a network environment such as that of FIG. 10, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

Lastly, while the present disclosure has been described in connection with the preferred aspects, as illustrated in the various figures, it is understood that other similar aspects can be used or modifications and additions can be made to the described aspects for performing the same function of the present disclosure without deviating therefrom. For example, in various aspects of the disclosure, mechanisms for deployment of shell devices were disclosed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system comprising:
    a subsystem configured to solicit a shell computing device activation input and determine whether the shell computing device activation input is valid;
    a subsystem configured to establish communication with a remote server and check a network access activation input upon a valid shell computing device activation input determination;
    a subsystem configured to receive configuration information on the shell computing device from the remote server;
    a subsystem configured to maintain the configuration information during the communication between the shell computing device and the remote server;
    and a subsystem configured to delete information about the communication and the configuration information from the shell computing device after the communication.

2. The system of claim 1, wherein shell computing device activation input includes biometric data.

3. The system of claim 2, wherein the biometric data includes at least one of (a) voice recognition, (b) iris scan, and (c) a thumb print.

4. The system of claim 1, wherein the subsystem configured to receive configuration information is further configured to receive user data.

5. The system of claim 4, wherein the subsystem configured to maintain the configuration information is further configured to maintain the user data during the communication.

6. The system of claim 5, wherein the subsystem configured to delete the configuration information is further configured to delete the user data after the communication.

7. The system according to claim 1, wherein the configuration information is based on a geographical location of the shell computing device.

8. A computer implemented method comprising:
    soliciting a shell computing device activation input and determining whether the shell computing device activation input is valid;
    establishing communication with a remote server and checking a network access activation input upon a valid shell computing device activation input determination;
    receiving configuration information on the shell computing device from the remote server;
    maintaining the configuration information during the communication between the shell computing device and the remote server; and
    deleting information about the communication and the configuration information from the shell computing device after the communication.

9. The method of claim 8, wherein shell computing device activation input includes biometric data.

10. The method of claim 8, wherein the biometric data includes at least one of (a) voice recognition, (b) iris scan, and (c) a thumb print.

11. The method of claim 8, further including receiving user data on the shell computing device.

12. The method of claim 11, further including maintaining the user data during the communication.

13. The method of claim 8, further including deleting the user data after the communication.

14. The method according to claim 8, wherein the configuration information is based on a geographical location of the shell computing device.

15. A non-transitory computer readable storage medium having computer executable instructions stored comprising:
an instruction configured to solicit a shell computing device activation input and determine whether the shell computing device activation input is valid;
an instruction configured to establish communication with a remote server and check a network access activation input upon a valid shell computing device activation input determination;
an instruction configured to receive configuration information on the shell computing device from the remote server;
an instruction configured to maintain the configuration information during the communication between the shell computing device and the remote server;
and an instruction configured to delete information about the communication and the configuration information from the shell computing device after the communication.

16. The computer readable storage medium of claim 15, wherein shell computing device activation input includes biometric data.

17. The computer readable storage medium of claim 16, wherein the biometric data includes at least one of (a) voice recognition, (b) iris scan, and (c) a thumb print.

18. The computer readable storage medium of claim 15, further including an instruction configured to receive user data.

19. The computer readable storage medium of claim 18, further including an instruction configured to maintain the user data during the communication.

20. The computer readable storage medium of claim 19, further including an instruction configured to delete the user data after the communication.

* * * * *